Aug. 31, 1926.
E. P. BONE
1,598,043
HEADLAMP
Original Filed Dec. 20, 1920
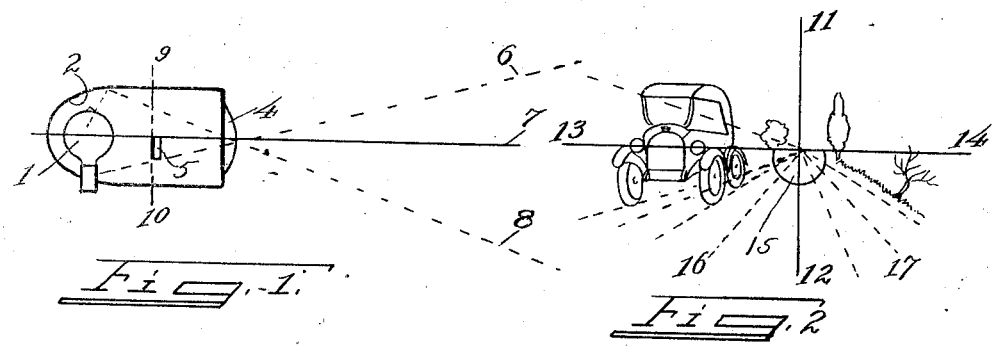
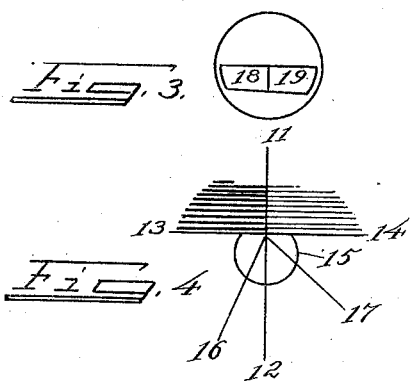
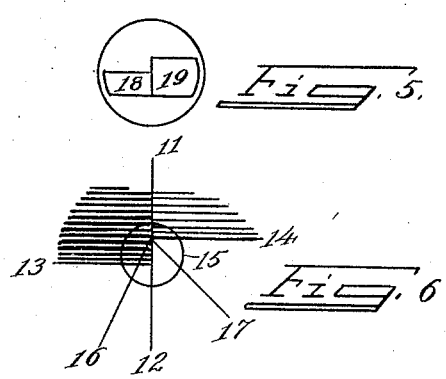
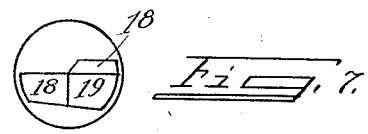
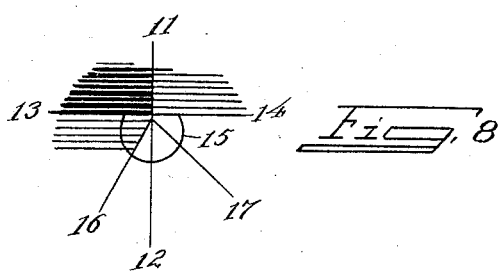
INVENTOR:
Evan P. Bone
BY
Walter A. Knight
ATTORNEY.

Patented Aug. 31, 1926.

1,598,043

UNITED STATES PATENT OFFICE.

EVAN P. BONE, OF CINCINNATI, OHIO.

HEADLAMP.

Original application filed December 20, 1920, Serial No. 432,018. Divided and this application filed April 23, 1923. Serial No. 634,009.

My invention relates to motor vehicle head lamps and particularly to light intercepting means therefor for use in such lamps as those shown in my Patent No. 1,389,291. This is a divisional application of my pending application Serial No. 432,018, filed Dec. 20, 1920.

The object of this invention is to provide means for illuminating the roadway under varying conditions without allowing a glare of light to be thrown in the eyes of the driver of an approaching vehicle; the screen used to accomplish this object being partly opaque and partly translucent, and may be formed of portions showing different degrees of translucency.

Another object of the invention is to produce a better general illumination of the roadway.

As in my patent above referred to, I also use in this invention, an image forming lens of such character that there is a conjugate focal point inside the lamp for each point in the field of illumination, viz: the roadway and objects upon and to the side thereof. These conjugate focal points within the lamp cover an imaginary surface which approximates and for all practical purposes may be spoken of as a plane. The illumination, therefore, of any point along the roadway and in the general field of illumination, is dependent upon the quantity of light emitted from its conjugate focal point in said plane. In connection with the image forming lens I also employ suitable means, as for instance, a properly constructed reflector, and a screen, constructed as hereinafter described for predetermining with economy and precision the quantity of light emitted from each of these conjugate focal points within the lamp. By these means the distribution of light rays along the roadway is effected as desired and, as will be seen, the illumination of the roadway at long ranges may be intensified while at the same time the beam is sharply cut off on certain lines and so reduced in intensity on other lines and over certain portions of the field of illumination as to prevent throwing a glare of light in the eyes of approaching persons, while retaining efficient use of the lamp for lighting the roadway.

The particular embodiments of my invention selected for illustration, are shown in the accompanying drawings, in which:—

Fig. 1 shows diagrammatically a longitudinal axial section of such a headlamp, the location of the screen therein, and its relation to the field of illumination, Fig. 2 is a perspective view of the field of illumination as seen from behind the lamp, Figs. 3, 5 and 7 are cross sections of the lamp on plane 9—10 of Fig. 1, showing three types of screens and Fig. 4, 6 and 8 are corresponding representations of the fields of illumination from these respective screen types.

Referring now to the drawings, and first to Fig. 1, the light radiating from the source 1, to the reflector 2, is thence directed thru the plane 9—10 to the lens 4, and projected into the field of illumination.

The plane 9—10 is the focal plane of the lens 4 and an image of whatever object is located in plane 9—10 is reproduced by the lens, in accordance with well known laws of optics. An interception means or screen 5, is located in the focal plane as shown. Its image, as a shadow of greater or less intensity depending upon the light transmitting characteristics of the screen, will appear on any objects within the lines 6 and 7 at practicable distances in front of the lamp. The shape and location of this screen 5 in the focus of the lens, in relation to the axis of the beam of light, regulates the dark and light portions of the field; for instance, if the eyes of the observer are located in the shadow within the lines 6 and 7, there is no glare; while, if the roadway is located within the lines 7 and 8, it receives full illumination from the lamp. The regulation as to deep shadow, less intense shadow and full lighting may be vertical as well as horizontal.

The general field of illumination as shown in Fig. 2 naturally divides, for purposes of illumination, into four quadrants bounded by the lines 11—12 and 13—14. The line 11—12 represents a meridian or vertical plane thru the lamp and 13—14 a plane at right angles thereto.

Under normal conditions of level road the plane 13—14 is on the level of the lamp and the eyes of drivers of opposing vehicles would be in one of the two upper quadrants. When the opposing driver turns aside to pass, into a position to the left of 11—12, his eyes are in the upper left quadrant, that is within the angle formed by the lines 11 and 13. Therefore, to avoid glare under normal conditions, the portion of the field above 13—14 should be in shadow, it being, however, of more importance to have the upper left quadrant in shadow because this is the position of the eyes of the opposing driver when he approaches within close range and a glaring light would become most intense. To provide illumination at long range, portions of the field just below 13—14 should be in full light and it is of more importance to have the lower right quadrant illuminated on account of the turning aside to the right of the road to pass.

Whenever the vehicle having headlamps equipped with such screens goes over the crest of a hill or the lamps are tilted upwardly from spring action on rough roads or from abnormal loading the plane 13—14 rises above the level and may bring the eyes of the opposing driver into the lower left quadrant in passing. In order to avoid glare under these circumstances means may be provided to extend the darkened area into this quadrant. The extension of the shadow into the lower left quadrant, however, is preferably limited so as to allow some close range illumination for the left of the roadway and for left turns.

Whenever the vehicle approaches the foot of a hill or the like, the plane 13—14 may strike the surface of the roadway so that the shadow covers a portion of the road and decreases the distance ahead which the driver can see. For such conditions a less dense shadow is provided in certain portions of the field, which serves to give some illumination and at the same time not permit intense glare. The light in the upper right quadrant may be given such an intensity as to provide a slight illumination when same is lowered to the roadway and yet, never causes intense glare, because the driver is only in that quadrant before turning to the left to pass a vehicle then a considerable distance ahead. It may even be tolerable to permit full light on the right half, relying upon the opposing driver to turn to the left when approaching within the range of bad glare. The shadow extending into the lower left quadrant may also have a partial illumination for the reason that such portions are rarely needed to prevent glare and a limited glare may be tolerated at such times for the sake of partial illumination at other times.

The shaded area on the diagrams of the field of illumination represent the shadows. The circle 15 of the figures represents the area of brightest illumination, it being preferable to have the brightest illumination at the intersection of the planes 11—12 and 13—14 in order that the roadway may have adequate illumination at long range and in the center of straight roads. The lines 16 and 17 represents the normal wheel tracks ahead, the same, on account of the perspective, appearing to narrow toward the vanishing point as the distance ahead increases.

Figure 3 shows a type of shutter with one quadrant 18, translucent, with another quadrant 19, opaque or less translucent, to illuminate the field as shown in Figure 4. The upper right quadrant has a light shadow, while the upper left quadrant has a darker shadow, thus providing illumination on both sides of a level road and also some illumination on the right side when the lamp is tilted downwardly at the foot of a hill or the like, but decreasing the intensity of the glare in the eyes of the opposing driver when he is on the right before turning aside to pass.

Figure 5 shows a type of shutter of different degrees of opacity or translucency 18 and 19, to illuminate the field as shown in Figure 6. The upper right quadrant has a light shadow while the upper left quadrant has a darker shadow which also projects into the lower left quadrant, thus providing illumination on the right, either in full or partially dimmed, for all conditions of hills or tilting, with full illumination for a moderate distance ahead on the left, but preventing glare on the left even if the lamp has a considerable upward tilt or in going over a hill.

Figure 7 shows a type of shutter with different degrees of opacity or translucency (18 and 19) to illuminate the field as shown in Figure 8. The upper left quadrant has a dark shadow with a lighter shadow extending into the lower left quadrant and with a lighter shadow in the upper right quadrant, thus providing full illumination on the right side of a level road, partial illumination to the left and some illumination on the right and left side when the lamp is tilted downwardly at the foot of a hill or the like, but decreasing the intensity of glare on the right before turning aside to pass, and decreasing the glare on the left if the lamp has a considerable upward tilt or in going over a hill.

The diagrams are shown with illumination as from only one lamp. When two lamps are used the shadows may overlap, but regulation as to preventing glare should apply to both lamps.

Obviously instead of sharply defining where dark and light shadow meet, dark and light shadows might be shaded into each other, so as to leave no clean cut line of demarcation. The screen to produce this effect would have its more and less translucent portions blended into each other in any well known manner.

I claim as my invention and desire to se- cure by Letters Patent of the United States:

In combination with a headlamp provided with means for projecting a real image, a screen disposed substantially at an inner focus of said means, conjugate with a portion of the field of illumination; one part of said screen of such a character as to throw a deep shadow over substantially the upper left quadrant of said field, and other part or parts of said screen of such a character as to throw shadows of less density over contiguous portions of said field.

In testimony whereof I have hereunto set my hand.

EVAN P. BONE.